US012270296B2

(12) United States Patent
Collins et al.

(10) Patent No.: US 12,270,296 B2
(45) Date of Patent: Apr. 8, 2025

(54) CEMENT EVALUATION

(71) Applicant: Halliburton Energy Services, Inc., Houston, TX (US)

(72) Inventors: Mark Collins, Houston, TX (US); Qingtao Sun, Spring, TX (US); Amit Padhi, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/229,941

(22) Filed: Aug. 3, 2023

(65) Prior Publication Data
US 2025/0043679 A1 Feb. 6, 2025

(51) Int. Cl.
E21B 47/16 (2006.01)
E21B 47/005 (2012.01)
E21B 47/107 (2012.01)
G01N 29/04 (2006.01)

(52) U.S. Cl.
CPC ............ *E21B 47/16* (2013.01); *E21B 47/005* (2020.05); *E21B 47/107* (2020.05); *G01N 29/041* (2013.01)

(58) Field of Classification Search
None
See application file for complete search history.

(56) References Cited

U.S. PATENT DOCUMENTS

| 5,216,638 | A | 6/1993 | Wright |
| 7,522,471 | B2 | 4/2009 | Froelich et al. |
| 7,663,969 | B2 | 2/2010 | Tang et al. |
| 11,098,583 | B1 * | 8/2021 | Sirevaag ............... E21B 49/003 |
| 2014/0177389 | A1 | 6/2014 | Bolshakov et al. |
| 2015/0219780 | A1 | 8/2015 | Zeroug et al. |
| 2016/0209539 | A1 | 7/2016 | Le Calvez et al. |
| 2017/0350999 | A1 | 12/2017 | Merciu |
| 2018/0067223 | A1 * | 3/2018 | Le Calvez ............. E21B 47/005 |

FOREIGN PATENT DOCUMENTS

| CN | 216110689 U | * | 3/2022 | |
| EP | 1505252 A1 | * | 2/2005 | ......... E21B 47/0005 |

OTHER PUBLICATIONS

CN-216110689-U English Language Translation (Year: 2022).*
Le Calvez, Jean-Luc et al., "Separation of Leaky Lamb Modes for Ultrasonic Evaluation of Multilayer Structures", 2015 International Congress of Ultrasonics, 2015 ICU Metz; Physics Procedia 70 (2015) 305-308.
Wang, Hua et al., "Understanding acoustic methods for cement bond logging", The Journal of the Acoustical Society of America; 139, 2407 (2016).
International Search Report and Written Opinion; PCT Application No. PCT/US2023/029839; mailed Apr. 26, 2024.

* cited by examiner

*Primary Examiner* — Curtis A Kuntz
*Assistant Examiner* — Jerold B Murphy
(74) *Attorney, Agent, or Firm* — NOVAK DRUCE CARROLL LLP

(57) ABSTRACT

Systems and methods of evaluating well cementation are disclosed. In certain embodiments, a tool is lowered into a casing surrounded by an annular material within a wellbore. An emitter of the tool emits an acoustic signal at a first pitch angle selected to excite a mixed-mode Lamb wave comprising a symmetric extensional (Sn) mode and an asymmetric flexural (An) mode of a Lamb wave in the casing. A receiver of the tool that is disposed at a first distance from the emitter receives a portion of the Lamb wave that has leaked from the casing at approximately the first distance.

13 Claims, 7 Drawing Sheets

CEMENT EVALUATION

TECHNICAL FIELD

The present technology pertains to evaluation of cement placement and quality in well completion.

BACKGROUND

Cementing a well is an essential step in almost all well completions. The intent is to fill the annulus between certain portions of the wellbore and the well casing with a cement, thereby preventing fluid flow outside of the casing. The quality and integrity of the well cementation is conventionally performed by exciting a single mode of an acoustic Lamb wave in the well casing and measuring the attenuation over a length of the casing, wherein the amount of attenuation is related to the acoustic compressional impedance and shear coupling of the material surrounding the casing. There is a trend toward using lightweight cements whose acoustic impedances approach that of water, making it difficult to determine whether the light-weight cement is properly placed.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
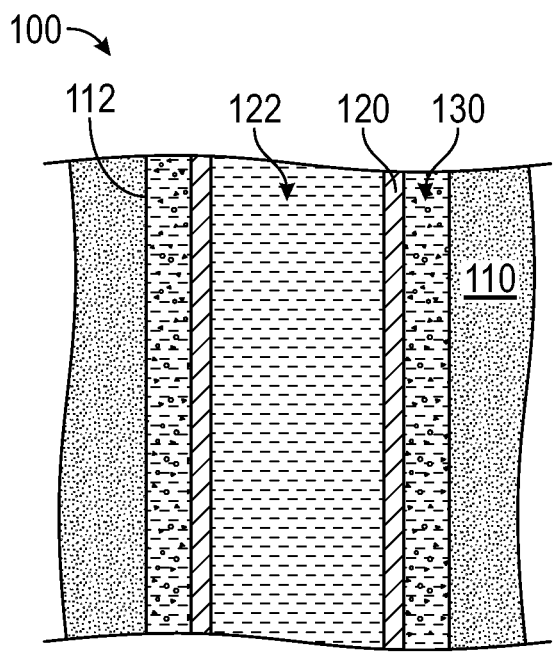
FIGS. 1-2 depict stages of cement placement during well completion, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Cementing is the process of placing cement between the casing and borehole in a well as part of the well completion. The main objectives of primary cementing are to seal the annulus and to obtain zonal isolation. The cement is placed as a slurry that then undergoes a hydration conversion to a solid. The objective is to obtain 100% displacement, i.e., fill 100% of the annulus with well-bonded cement. For various production reasons, there is a trend toward using lightweight cements.

The quality and integrity of the well cementation can be determined by exciting a single mode of an acoustic Lamb wave in the well casing and measuring the attenuation over a length of the casing, wherein the amount of attenuation is related to the compressional acoustic impedance and shear coupling of the material surrounding the casing, i.e., the cement and/or water. Conventional cement has an acoustic impedance that is 3-4 time the impedance of water, making it easy to differentiate the presence of cement vs. water. Lightweight cements have reduced acoustic impedances that approach the acoustic impedance of water, making it difficult to determine whether the light-weight cement is properly placed.

The technology disclosed herein addresses the foregoing challenges by describing systems and methods of evaluating well cementation. The disclosed system excites multiple modes of a Lamb wave in the casing and captures the modes at one or more distances along the wellbore. By combining measurements of the multiple modes, the disclosed methods provide improved classification (e.g., fluid vs. well-bonded solid) of the material surrounding the casing.

In this disclosure, the term "water" means a fluid comprising one or more of liquid water ($H_2O$), a gas that may include air and/or natural gas and/or other gaseous material, a nonaqueous liquid that may include petroleum and/or solvents and/or well production liquids, dissolved materials, and suspended solids.

In this disclosure, the term "cement" means any mixture of materials that is originally a slurry, e.g., a non-Newtonian fluid comprising liquids and solids, that undergoes a chemical reaction, e.g., hydration, that irreversibly converts the slurry to a solid. Cements formulated for use in the petroleum and drilling industries may contain a standard cement, e.g., Portland cement, as well as water and additives such as accelerators, retarders, extenders including microspheres, and gas and/or a foaming agent. Specialty cements may include epoxy or other resins.

FIG. 1 depicts a schematic view 100 of a wellbore prior to cement placement during well completion, in accordance with various aspects of the subject technology. A wellbore 112 has been drilled through a formation 110 and a casing 120 placed in the wellbore 112. In this example, the casing 120 is filled with water 122 and the annulus between the casing 120 and the wellbore 112 is filled with a fluid 130, e.g., drilling mud.

Figure 2:
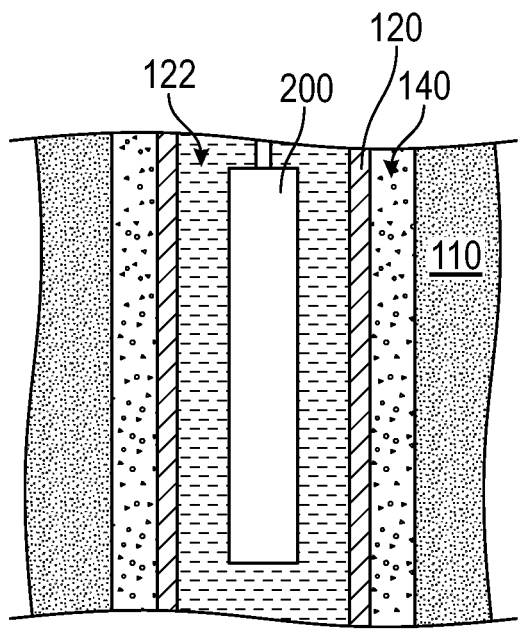

FIG. 2 depicts an example of 100% displacement of cement placement, in accordance with various aspects of the subject technology. The fluid 130 of FIG. 1 has been completely replaced, i.e., 100% displacement, by a cement 140. An evaluation tool 200 has been lowered into the casing 120.

Table 1 provides typical properties of cements adapted for use in wellbores.

TABLE 1

| Parameters | $V_p$ (m/s) | $V_s$ (m/s) | $\rho$ (kg/m$^3$) | $Z = \rho V_p$ (MRayl) | $V_s/V_p$ |
|---|---|---|---|---|---|
| Conventional Cement (CC) | 2823 | 1729 | 1920 | 5.4 | 0.6125 |
| Medium Cement (MC) | 2400 | 1440 | 1600 | 3.8 | 0.600 |
| Low-Density Cement (LDC) | 1960 | 1120 | 1200 | 2.35 | 0.571 |
| Ultra-Low Cement (ULC) | 1600 | 1000 | 1100 | 1.8 | 0.625 |
| Water | 1500 | 0 | 1000 | 1.5 | 0.0 |

Figure 3:
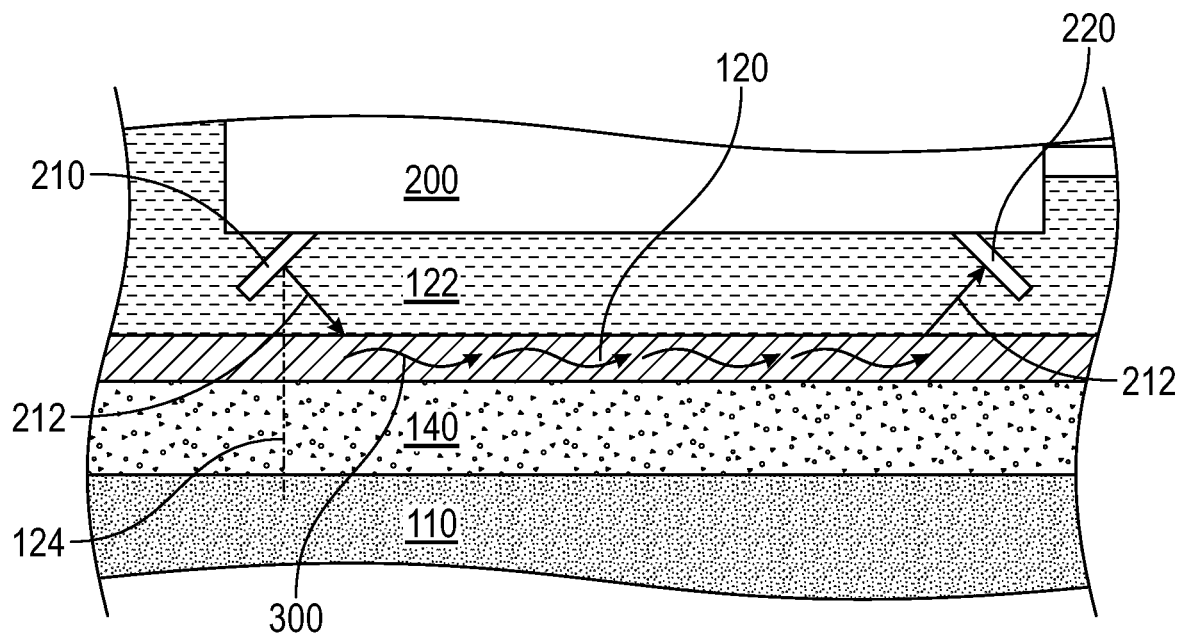
FIG. 3 depicts operation of an acoustic evaluation tool, in accordance with various aspects of the subject technology.

FIG. 3 depicts an example operation of an acoustic evaluation tool 200, in accordance with various aspects of the subject technology. The tool 200 has an emitter 210 and a receiver 220 disposed at angles to a perpendicular 124 to the casing. This arrangement is referred to herein as a "pitch-catch" method. The emitted acoustic signal 212 excites a Lamb wave 300 in the casing 120. The Lamb wave 330 may have one or more symmetric extensional ($S_n$) modes and one or more asymmetric flexural ($A_n$) modes.

One method of pitch-catch cementation evaluation (Wang, J. Acoust. Soc. Am. 139 (5) May 2016) is performed by emitting a sonic wave (with frequency of about 20 kHz) and measuring the attenuation of the $S_0$ Lamb wave along the borehole axis direction with certain receiver spacing. The attenuation is sensitive to the shear coupling of the material behind the casing, which is higher in a good bonding condition than that in a bad bonding condition. Cement bond logging (CBL) derives the attenuation factor from the first arrival amplitude only, whereas variable density logging (VDL) uses the amplitude of the full waveform. There are two industry standard measurements of the CBL/VDL tool, with a 3-ft spacing for recording the casing wave and a 5-ft spacing for the full wave, respectively. Conventional pitch-catch tools use only the $A_0$ mode as this mode is sensitive to shear velocity wherein water is zero and low-density cement is much larger than zero. A pure $A_0$ mode can be generated when the incident angle of the emitted acoustic wave is greater than a casing shear critical angle, which is dependent upon, the borehole fluid velocity and casing shear velocity, and typically above 30 degrees from perpendicular. The desired incidence angle and frequency of the transmitted wave is dependent on the mode dispersion, which is controlled by the casing thickness and annular material properties.

Another method of cementation evaluation, referred to herein as "pulse-echo," comprises emitting an ultrasonic (200-700 kHz) pulse that is directed approximately perpendicular to the casing. This excites a resonance (the $S_1$ mode) in the casing caused by the constructive interference of multiple internal reflections from the inner and outer surface of the casing. The return signal is comprised of the first reflection from the inner surface of the casing (first echo) followed by a trailing reverberation train from the $S_1$ resonance. The return signal is recorded by a receiver co-located with the emitter (transceiver). Cement and water are differentiated by estimating compressional acoustic impedance from the relative amplitudes of the first echo and reverberation train. The resolution of a pulse-echo measurement in the low-impedance range is limited to approximately +/−0.5 MRayl (1 MRayl=1000 kg/m$^2$/sec), which makes it difficult to distinguish water (~1.5 MRayl) from an ultra-low cement (~1.8 MRayl).

Figure 4:
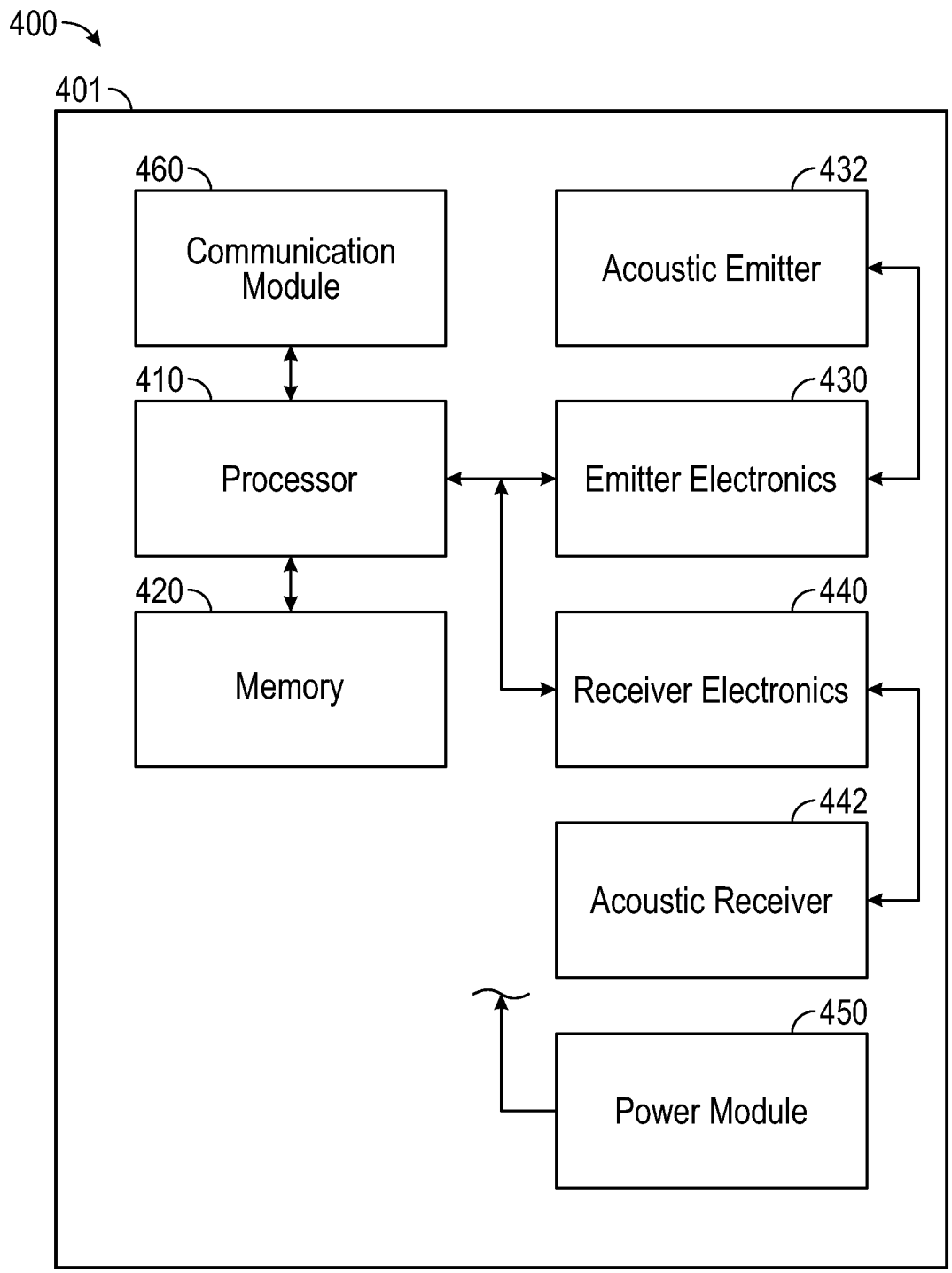
FIG. 4 depicts operation of an exemplary acoustic evaluation tool, in accordance with various aspects of the subject technology.

FIG. 4 is a block diagram 400 of an exemplary acoustic evaluation tool 401, in accordance with various aspects of the subject technology. A processor 410 is communicatively coupled to emitter electronics 430 that drive an acoustic emitter 432 and to receiver electronics that operate an acoustic receiver 442 and provide the received signals to the processor 410. The processor 410 is also coupled to a memory 420 that contains instructions that, when loaded into the processor and executed, cause the processor to execute certain steps of predefined processes. The processor 410 is further coupled to a communication module 460 that provides communication between the processor and external systems, e.g., remote processors, servers, databases, user interfaces, and such. The system 401 also comprises a power module 450 that provides power to all internal modules, although the connections are not shown in FIG. 4 for clarity.

Figure 5:
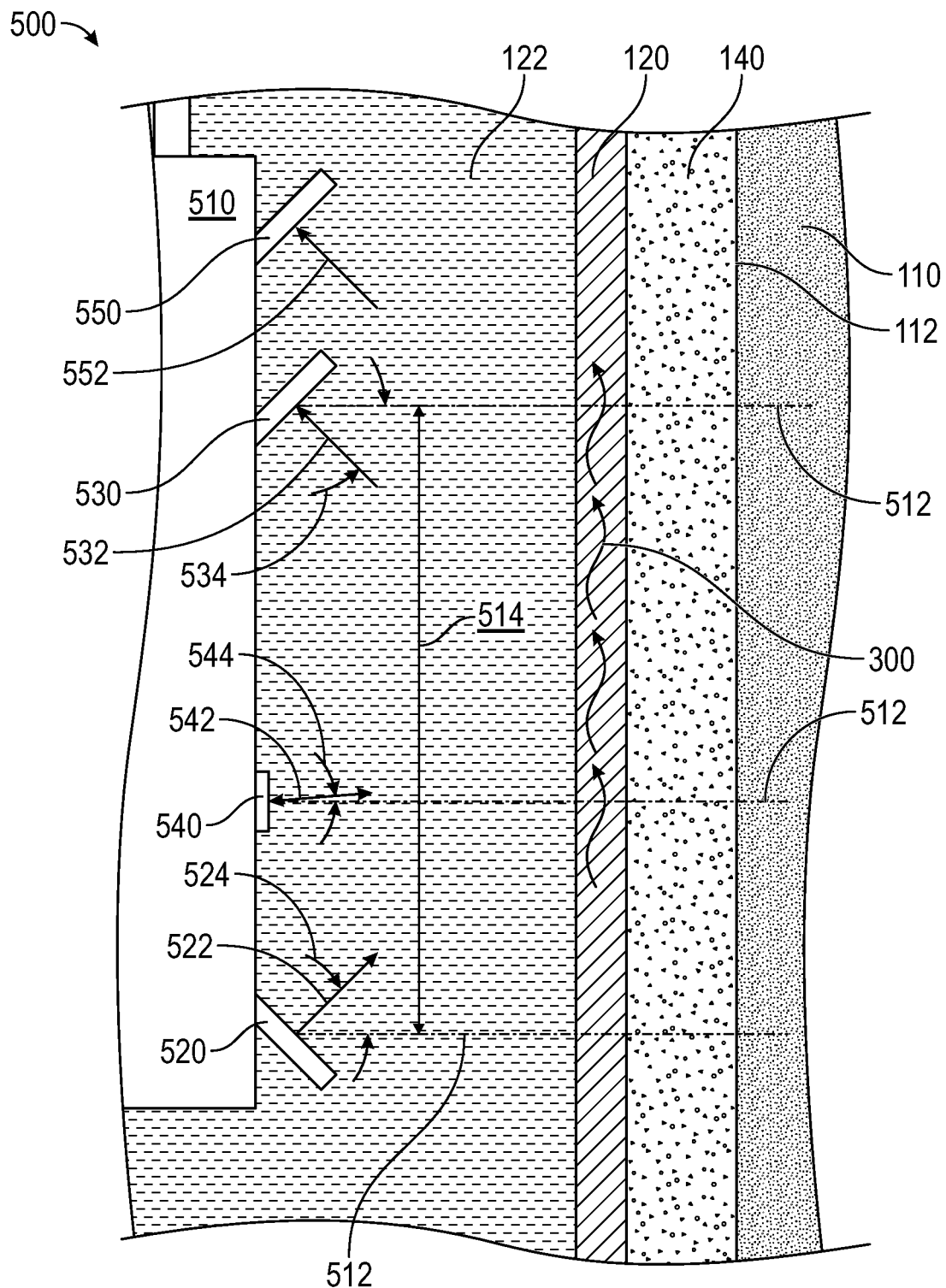
FIG. 5 depicts operation of an exemplary acoustic evaluation tool, in accordance with various aspects of the subject technology.

FIG. 5 depicts an exemplary acoustic evaluation tool 500, in accordance with various aspects of the subject technology. The tool 500 has a body 510 configured to be lowered into casing 120 within a wellbore 112. An emitter 520 is coupled to the body 510 at a first pitch angle 524 from perpendicular 512 and configured to emit an acoustic signal 522 that is selected to excite an $S_n$ mode and an $A_n$ mode of a Lamb wave 300 in the casing 120. A receiver 530 is coupled to the body 510 at a distance 514 from the emitter 520 and configured to receive an acoustic signal 532 that is a portion of the Lamb wave 300 that has leaked from the casing 120.

Selection of the pitch-catch angle 524 determines which Lamb wave modes will be excited in the casing 120. Angles below a first compressional critical angle, which is based on the borehole fluid velocity and casing compressional velocity, will typically excite $A_1$, $S_1$, and higher modes. Angles above the first critical angle and below a second critical angle will typically excite the $S_0$ mode without exciting the $A_0$ mode. Angles above the second critical angle will typically excite the $A_0$ mode without exciting the $S_0$ mode. For the example of a 5 mm plate immersed in liquid water ($H_2O$), the first critical angle is approximately 15 degrees, and the second critical angle is approximately 29 degrees (Wang, ibid). Conventional wisdom is to select an angle and frequency band in order to excite a single mode, as the other mode signals are considered noise. This makes it easier to measure the mode attenuation for a tool with only one or two receivers. For example, a system using the $S_0$ mode will select a sonic frequency, e.g., 20 kHz, and an angle 524 close to 15 degrees while a system using the $A_0$ mode will select an angle 524 above 30 degrees. In comparison, the transceiver 540 will select an ultrasonic frequency, e.g., 400-600 kHz, and an incidence angle 544 close or equal to zero degrees measured relative to the casing normal vector, i.e., the vector perpendicular to the casing surface. This is done to stimulate the $S_1$ mode as this mode is sensitive to the acoustic compressional impedance and to a lesser degree sensitive to the shear velocity of the annular material. The dependence on shear is due to the finite size of the transceiver and any small incidence angle it may have, as a normally incident plane wave has no sensitivity to the shear velocity at all.

In certain embodiments, the disclosed systems and methods intentionally select a pitch-catch angle 524 that will excite both the $S_0$ mode and the $A_0$ mode so that new waveform attributes sensitive to the annular shear velocity may be estimated from the interaction of the mixed modes, thus improving the classification of the annular material. In certain embodiments, the angle 524 is selected to be between the first critical angle and the second critical angle. In certain embodiments, the angle 524 is within the range of 15-30 degrees. In certain embodiments, the angle 524 is within the range of 18-27 degrees. In certain embodiments, the angle 524 is within the range of 20-25 degrees.

In certain embodiments, the tool 500 comprises a pulse-echo transceiver 540 that is coupled to the body 510 at an angle 544 from perpendicular 512. The transceiver 540 comprises an emitter (not visible in FIG. 5) that is configured to emit an acoustic signal 542 and a co-located receiver (not visible in FIG. 5) that is configured to receive reflections of signal 542 from the interfaces between the borehole 122, casing 120, and cement 120 while avoiding the reflections from the substrate 110. In certain embodiments it may be advantageous to mount the transceiver at a known small angle to enhance sensitivity to the annular shear velocity while still maintaining sufficient signal to noise ratio to evaluate the cement.

In certain embodiments, the tool 500 comprises one or more additional receivers 550 coupled to the body 510 and configured to receive signals 552 that are additional portions of the Lamb wave 300 that has leaked from the casing 120 at distances from the emitter 520 that are different, e.g., farther or closer, than the distance 514 of receiver 530. As mentioned earlier the motivation for exciting a single dominant mode is the desire to compute a reliable attenuation with 2 receivers (attenuation is measured across the receivers so knowledge of the source is not required) or one receiver (only relative attenuation across depths is estimated as in CBL unless one knows the amplitude of the transmitted wave). A $_n$ acoustic tool with multiple receivers may relax this dominant mode restriction since more information can be collected to interpret the mixed mode behavior.

In certain embodiments, the tool 500 does not include a pulse-echo transceiver 540 or the transceiver data is not used in subsequent processing. In certain embodiments, the disclosed methods of data analysis are based solely on pitch-catch data.

Figure 6A:
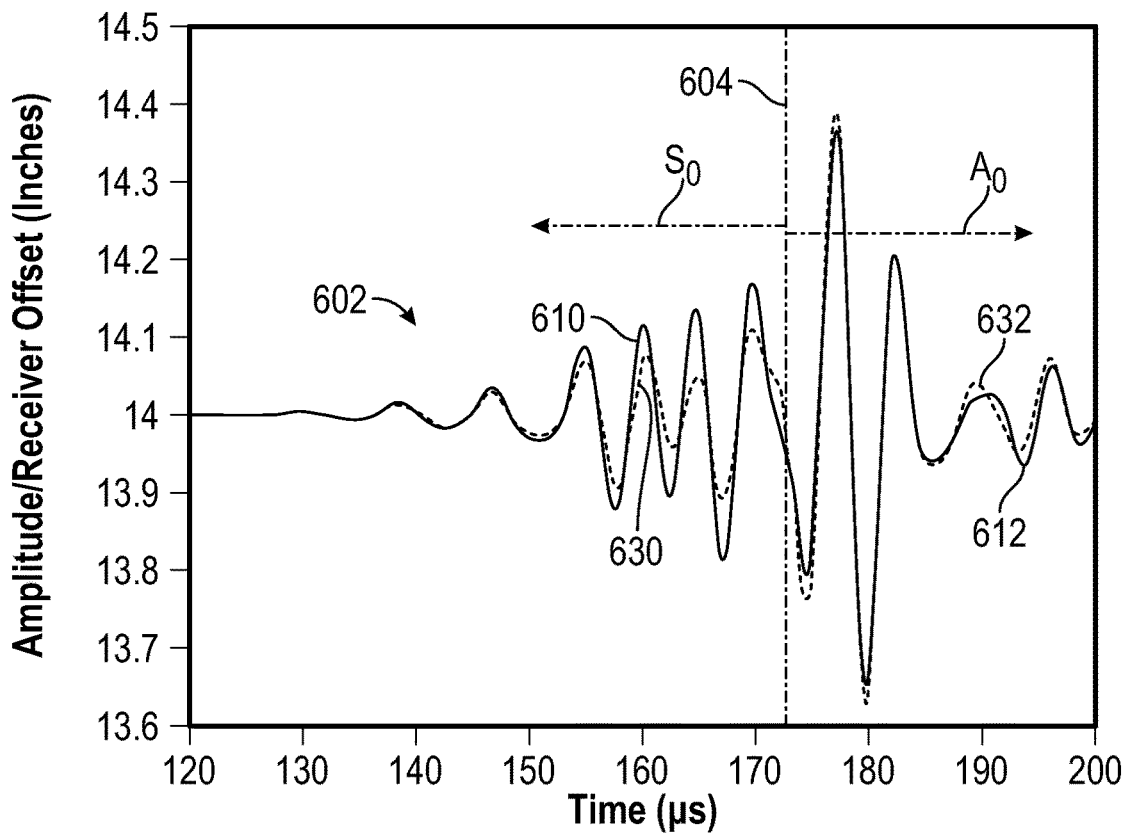
FIGS. 6A-6B depict example waveforms of received Lamb waves, in accordance with various aspects of the subject technology.
Figure 6B:
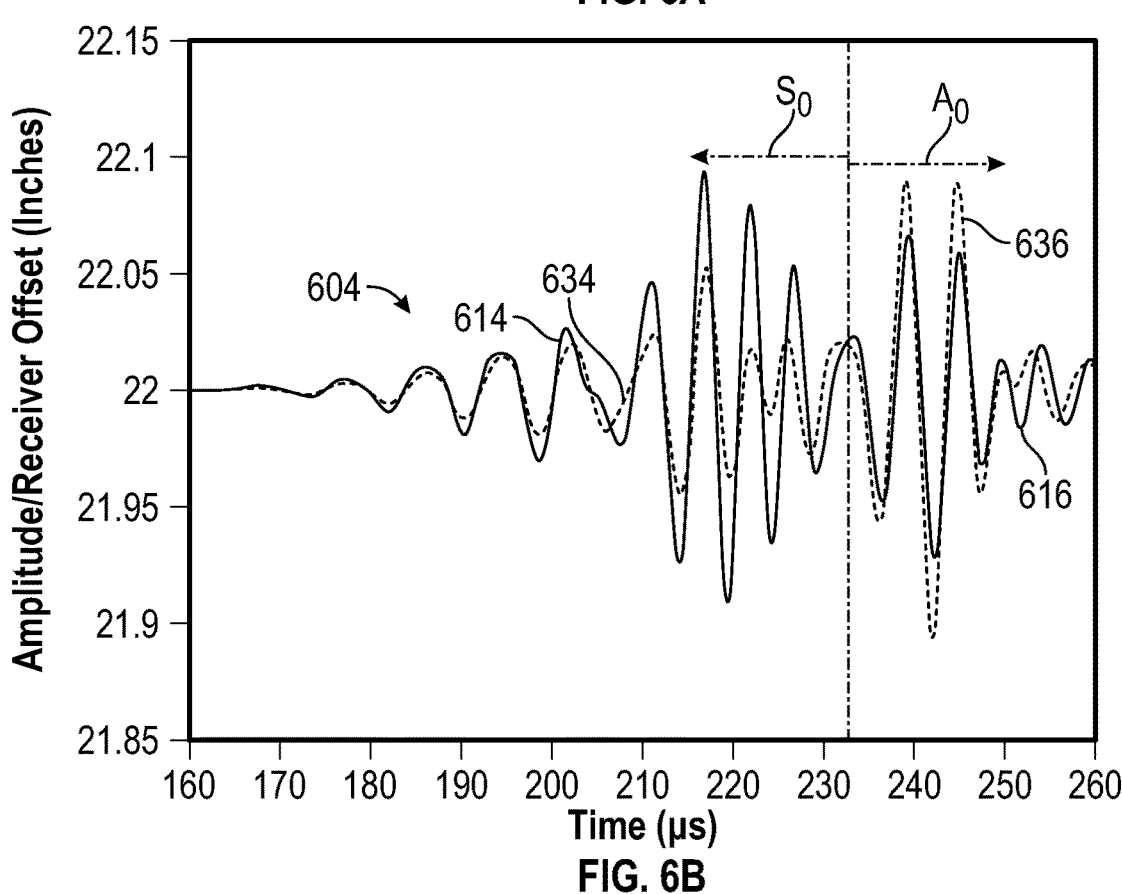

FIGS. 6A-6B depict example waveforms 602, 604 that were received at two receivers at different distances from a common pitch-catch emitter, in accordance with various aspects of the subject technology. The waveforms were computed using a 2D analytic code. The finite size 2D emitter emitted an acoustic signal at an angle of 25 degrees from perpendicular that induced a Lamb wave in an adjacent casing modeled as a flat plate which then leaked the received waveforms at the different distances.

FIG. 6A depicts an example waveform 602 received by a receiver at a distance of 14 inches from the emitter. The solid-line waveform 610, 612 is associated with a "free" casing, e.g., the annulus around the outside of the casing is filled with water of the same density and compressional velocity as low density cement, while the dashed-line waveform 630, 632 is associated with a casing with 100% displacement, i.e., the entire annulus is filled with well-bonded low-density cement. In this example, the cement is a low density cement having a $V_s$=1960 m/s and an acoustic impedance of ~2.35 MRayl while the water has the same properties with $V_s$=0. The borehole fluid is aqueous water. Sensitivity to the shear velocity is clear.

The waveform 602 has been separated into the portions 610, 630 associated with the $S_0$ mode and portions 612, 632 associated with the $A_0$ mode. The position of the dividing line 604 can be computed from theoretical or empirical time-of-flight calculations or developed experimentally in the lab or by computational modeling. One can see that the modes attenuate at different rates and the distribution of energy between $A_0$ and $S_0$ changes as the multi-mode Lamb wave propagates along the casing. Furthermore, the attenuations and distribution of energy are sensitive to the shear value of the annular material.

FIG. 6B depicts an example waveform 606 received by a second receiver at a distance of 22 inches from the same emitter. The solid-line waveform 614, 616 is associated with the prior waveform 610, 612 and a "free" casing while the dashed-line waveform 634, 636 is associated with the prior waveform 630, 632 and a casing with 100% displacement. The waveform 606 is not presented at the same amplitude scale as waveform 602 in FIG. 6A.

Various attributes of the $S_0$ mode and $A_0$ mode portions of the waveforms 602, 606 can be developed. In certain embodiments, a magnitude of one or more of the waveforms 610, 612, 614, 616 is measured. In certain embodiments, the attribute is the percentage reduction in the magnitude of sequential peaks of one of the waveforms 610, 612, 614, 616. In certain embodiments, other attributes of a waveform, as known to those of skill in the art, can be measured.

In certain embodiments, the waveforms 610, 614 are collected from a section of a wellbore known to have a free casing while the waveforms 630, 634 are collected from the section of the same wellbore where the cementation is being evaluated. In certain embodiments, the attribute of a ratio of peak values of the waveforms 610, 630 and another attribute of the ratio of peak values of the waveforms 614, 634. In certain embodiments, other attributes of change in a waveform sampled at two points in space and/or time, as known to those of skill in the art, can be measured.

In certain embodiments, a parameter is determined based on the attributes of one or more of the waveforms 602, 606. In certain embodiments, a parameter is determined from a comparison of attributes of related waveforms 610, 614, for example the attenuation over the distance between the two or more receivers. In certain embodiments, a parameter is determined from a comparison of a common waveform collected with different materials in the annulus, e.g., comparing waveform 630 collected from a section of casing that has been cemented with a waveform 610 collected from a section of the same casing known to be free.

Figure 7:
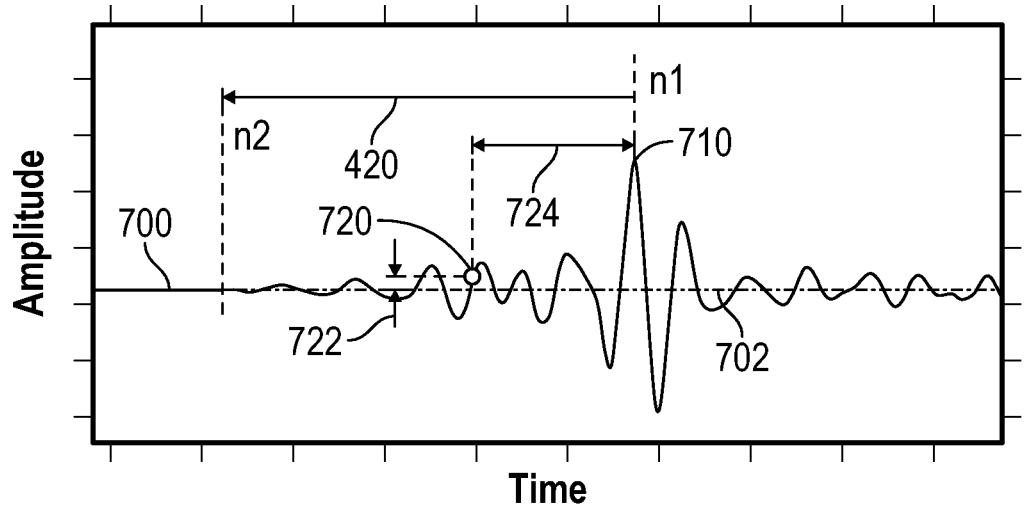
FIG. 7 depicts an example of determining a moment of an energy distribution of a waveform, in accordance with various aspects of the subject technology.

FIG. 7 depicts an example of determining a first moment of an energy distribution of a set of waveforms in different shades of gray 700, in accordance with various aspects of the subject technology. The extremum waveforms in FIG. 7 correspond to the waveforms in FIG. 6A with the other waveforms plotted in intermediate shades of gray corresponding to intermediate shear velocities between those expressed in FIG. 6A. Waveforms have a plurality of inherent attributes, for example the value 722 of each point 720 along the curve, known to those of skill in the art. One attribute is the moment of the energy of the waveform between two points in time, n1 and n2, relative to reference point n0 as designated in FIG. 7 where n0=n1 is chosen as the peak value 710. In general, the times n1, n2, and n0 can be selected according to any repeatable criteria. This requires temporal location of the two modes. Referring back to FIGS. 6A and 6B the $S_0$ mode arrives first. Thus, the leading edge of the $S_0$ mode can be identified using a threshold. The near receiver $A_0$ mode in FIG. 6A has the biggest amplitude for both annular materials, so the $A_0$ mode can be identified using the peak amplitude of the waveform. The farther receiver shown in FIG. 6B has more separation in time between the two modes, so that the waveform envelope can be used to locate the two modes. Mode arrival times may also be determined using empirical relationships based on measured mud velocity, receiver position relative to the pitch-catch transducer, offset of the transducer and receivers relative to the inner surface of the casing, and angle of incidence. For larger numbers of receivers (N≥4) semblance techniques become useful for locating the modes, and it also becomes feasible to separate the modes using known signal processing techniques in the time or frequency domain. Once the modes are temporally located and/or separated metrics can be computed.

In certain embodiments the first moment of the energy distribution can be computed at multiple receivers to create multiple attributes. In certain embodiments n0 is the peak of A0 in FIG. 6A. In certain embodiments n0 is the dashed-dot dividing line in FIG. 6B determined by the envelope minimum between the two modes. In all embodiments the reference point, n0, is chosen to make the computed moment sensitive to the energy distribution between the $S_0$ and $A_0$ modes.

In certain embodiments, the position of n1 is based on an envelope of one or both of the S0 mode and the A0 mode portions of a waveform. The second time n2 can be selected either based on an attribute of the waveform 700, e.g., the time of the first waveform value that exceeds a threshold, or a predetermined time interval 420 from n1.

The first moment (EM1) of an energy distribution between points n1 and n2 is given by the equation:

$$EM1 = -\frac{\sum_{n1}^{n2}(n-n_0)n\varphi^2}{\sum_{n1}^{n2}\varphi^2}$$

wherein:
n a point 720 of the waveform evaluated from times n1 to n2 (effectively over the time interval 420)
φ the value 722 of the point 720

As noted previously, the embodiment depicted in FIG. 7 chooses n1=n0. The overall minus sign in the moment equation was arbitrarily chosen to make the moment positive in FIG. 9. The first moment of the energy is sensitive to the energy distribution between the S0 and A0 modes. Those skilled in the art will appreciate that many equations exist with similar sensitivity, and the particular example provided is not meant to limit the invention. An alternative embodiment visualizing the distribution of energy between the modes creates a log track directly from the envelope of the waveforms to show the enhancement of S0 relative to A0 vs. depth.

Other metrics include the attenuations of $A_0$ and $S_0$ across an array of multiple receivers, e.g., receivers 530, 550 of FIG. 5, with or without wave separation. In certain embodiments, the attenuation metric goes beyond a strict exponential decay, typically measured in dB, to include any predictable amplitude pattern measured across the receiver array caused by attenuation, mode interference, and/or near field affects. Further metrics may be acquired by changing the pitch-catch incidence angles 524, 534. A pitch-catch angle that is less than the casing compressional wave critical angle will excite higher modes, e.g., $S_1$ and $A_1$, that may also be characterized.

Figure 8:
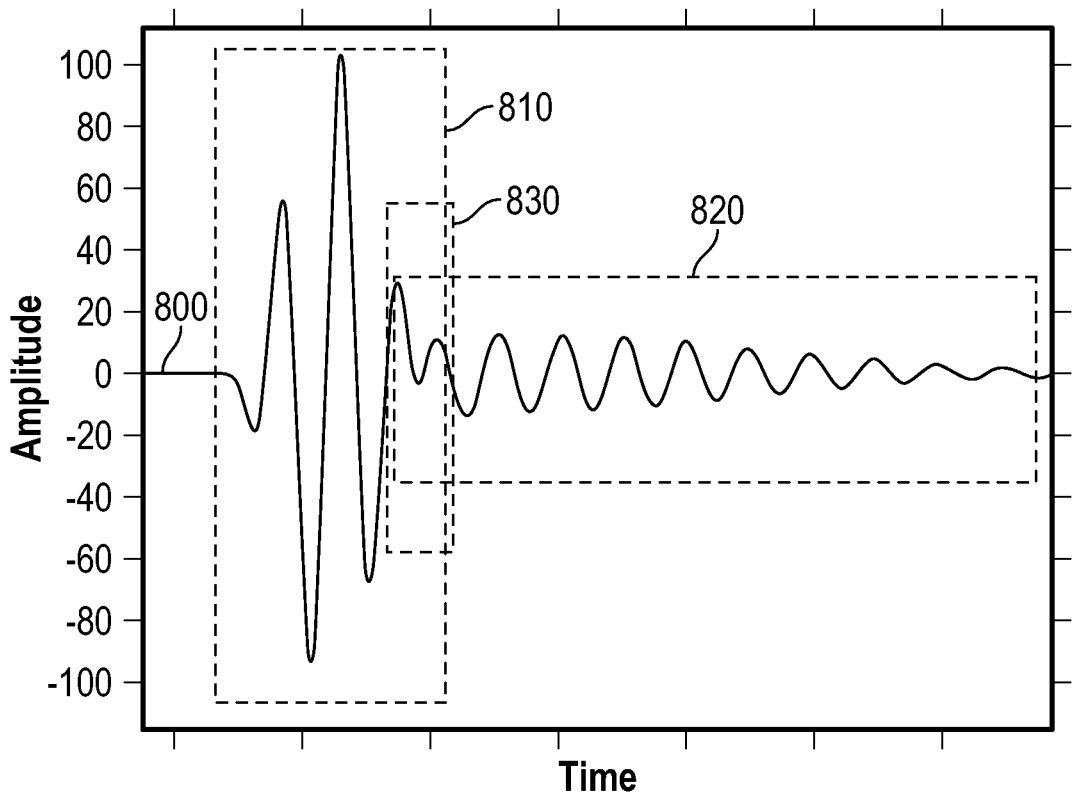
FIG. 8 depicts an example pulse-echo waveform, in accordance with various aspects of the subject technology.

FIG. 8 depicts a set of pulse-echo waveforms 800, in accordance with various aspects of the subject technology. A typical pulse-echo waveform consists of a large first echo waveform 810 reflected from the inner surface of the casing followed by a reverberation train 820 due to multiple reflections in the casing. The first echo 810 and reverberations 820 overlap in an intermediate time interval 830. The waveforms were generated using a finite size 2D transceiver model at normal incidence. The set of waveforms is broken up into subsets. Each subset has a different color in the plot. Each subset has a different fixed compressional annular impedance. The set of waveforms in each subset corresponds to a sequence of shear velocities ranging from zero to the values shown in Table 1. One can observe from the reverberations that they are primarily sensitive to the compressional impedance and secondarily sensitive to the shear velocity. The sensitivity to the shear is a consequence of the transceiver having finite size such that its wavefront is not a normally incident plane wave. Many attributes can be computed from the pulse-echo waveforms. Some typical attributes known to those skilled in the art are group delay, energy ratio of the first echo and reverberations, reverberation decay rate, etc. Secondary attributes may also be computed, for instance by estimating an impedance value from the group delay using an algorithm.

In certain embodiments, simplistic raw impedance estimates are calculated for the waveforms of FIG. 8 using the 1D reflectivity formula for a plane wave at normal incidence impinging on a flat plate. The raw impedance value calculated in this manner will differ from the true impedance value because the 1D reflectivity formula does not account for the finite size of the transceiver, e.g., transceiver 540 of FIG. 5. Using a 2D antenna model may provide a better estimate of the acoustic impedance, but this is unnecessary. One only requires attributes that are easily computed and sensitive to the compressional and/or shear velocity of the annular material.

Figure 9A:
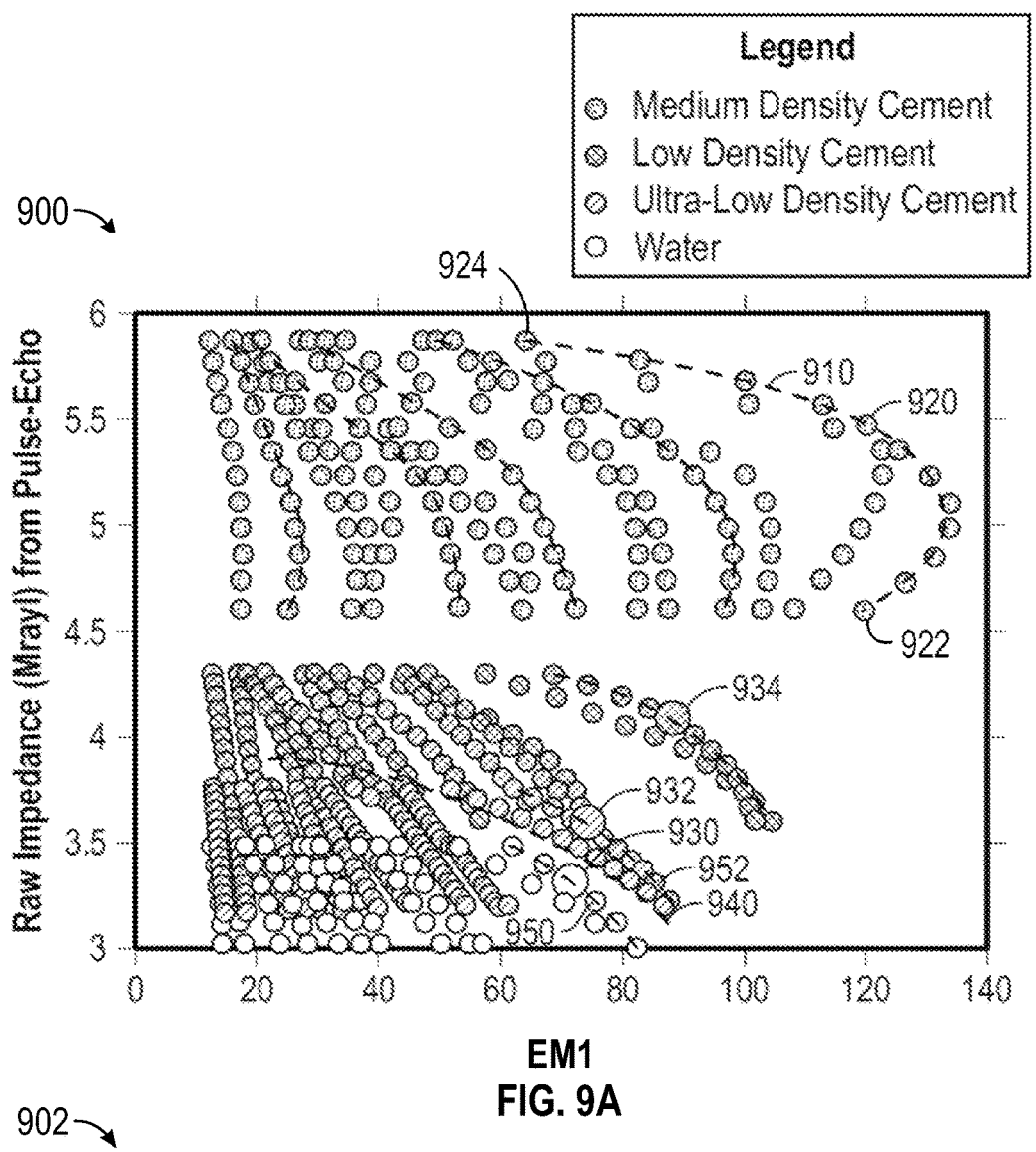
FIGS. 9A-9B depict example plots of the pulse-echo impedance vs the energy moment, in accordance with various aspects of the subject technology.

FIG. 9A depicts an example plot 900 of pulse-echo raw impedances vs pitch-catch energy moments, in accordance with various aspects of the subject technology. The values of plot 900 were generated using a 2D analytic model of a tool within a wellbore, e.g., as shown in FIG. 5. A 2D transducer is at incidence angle 0° for the pulse-echo waveforms shown in FIG. 8 and a 2D transmitter is at incidence angle 25° for the pitch-catch waveforms shown in FIG. 7. The 2D analytic code models the wellbore casing as a flat plate. The pulse-echo waveforms are recorded at the transducer, while the pitch-catch waveforms are recorded at an array of 15 receivers, disposed at respective distances from a common emitter. The raw impedance values were calculated using a 1D reflectivity formula as described with respect to FIG. 8. The EM1 values were calculated using the particular moment formula defined above. There are four different sets of markers shown in the plot corresponding to three different cements (medium, low, and ultra-low density) and water in the annulus. The material properties are in Table 1. The borehole fluid is aqueous water ($H_2O$). Each material was evaluated over a range of shear velocities while all other properties were held constant. The resulting Impedance-EM1 values were plotted as a string, e.g., string 910 of the medium density cement, over a range of shear-to-compressional velocity ratio (Vs/Vp) that varies from zero (the bottom marker of a string) to the nominal value shown in the last column of Table 1 (top marker of the same string). There are 15 strings of data points in each cement "type" group that correspond to 15 receivers spaced from 8-22 inches from the emitter. The data points within the string represent the results associated with respective Vs/Vp ratios. For example, the curve 910 is associated with one receiver and evaluated over a Vs/Vp range for water of zero to 0.5, wherein marker 922 is associated with Vs/Vp=0 and marker 924 is associated with Vs/Vp=0.5.

It is clear from the gap between the Medium Density cement data points and the aqueous water data points that the pulse-echo raw impedance is sufficient to reliably distinguish 100% displacement by a Medium Density well bonded cement from aqueous water.

Figure 9B:
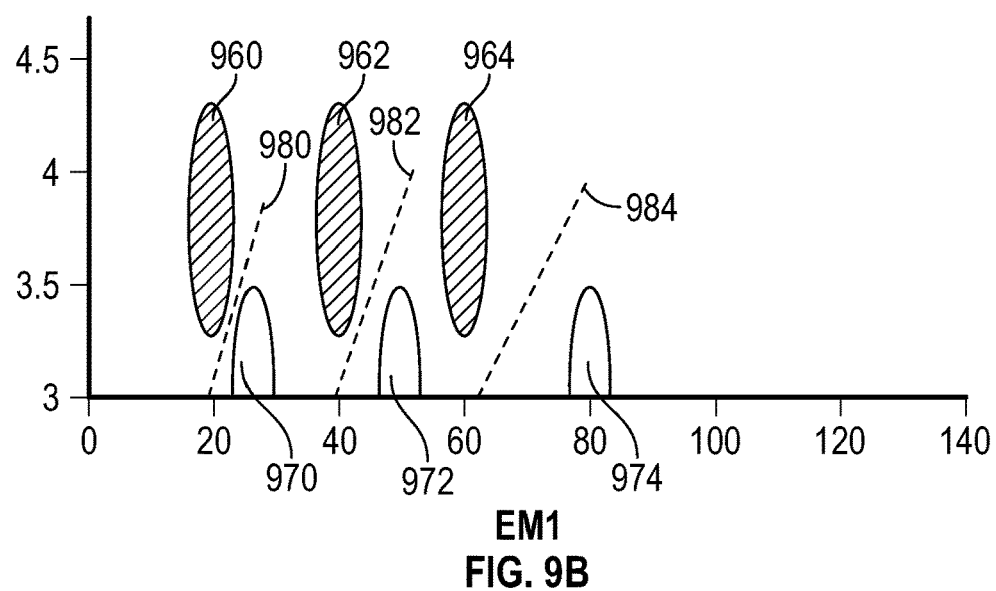

FIG. 9B depicts an example plot 902 of pulse-echo raw impedances vs pitch-catch energy moments for multiple receivers of a single tool, in accordance with various aspects of the subject technology. Distinguishing ultra-low density (ULD) well-bonded cement from water based only on the pulse-echo value is difficult, as the ranges overlap and the impedance value usually has a measurement standard deviation of approximately +/−0.5 MRayl error. However, if one uses both the impedance and EM1 measurements, the classification of the annular material as well-bonded lightweight cement or water is improved. For the example shown in FIG. 9B, many measurements with ULD well-bonded cement in the annulus and many measurements with water are made for three receivers at different distances from a common emitter. The scatter plots 960, 962, 964 are the measurements with ULD lightweight cement in the 2D parameter space while the scatter plots 970, 972, *1* 974 are the respective measurements with water. The pairs of measurement "clouds" have enough separation for proper classification. For the first receiver, the data point set 960 are above a classification line 980 and therefore are classified as well-bonded cement while data point set 970 are below the boundary line 980 and are classified as water. Similar boundary lines 982, 984 are provided for the second and third receivers and their respective data point sets 962 & 972, 964 & 974. In certain embodiments, a more aggressive classification scheme positions the boundaries 980, 982, 984 closer to the data point sets 960, 962, 964 and classifies everything below the boundaries as water, poorly bonded cement, or partial displacement.

The example given in FIGS. 9A-9B is not meant to limit the invention. Many attributes can be used to do the classification. For example, each receiver can provide its own EM1 attribute. Many other attributes have already been discussed. Once the attributes are collected their values in the multi-dimensional attribute space are used to evaluate the cement based on a mapping of the values to the cement properties. The classification boundaries are established using lab experiments and modeling or by analyzing the clustering of metrics from prior wells. The boundaries may also be established in real time for a particular well if a pass contains a section with free pipe. In the preferred embodiment M>2 attributes are used, and the boundaries are defined in M-dimensional attribute space to better differentiate the fluid from the low density cement. The classification may also be done using artificial intelligence (AI) algorithms and training.

Figure 10:
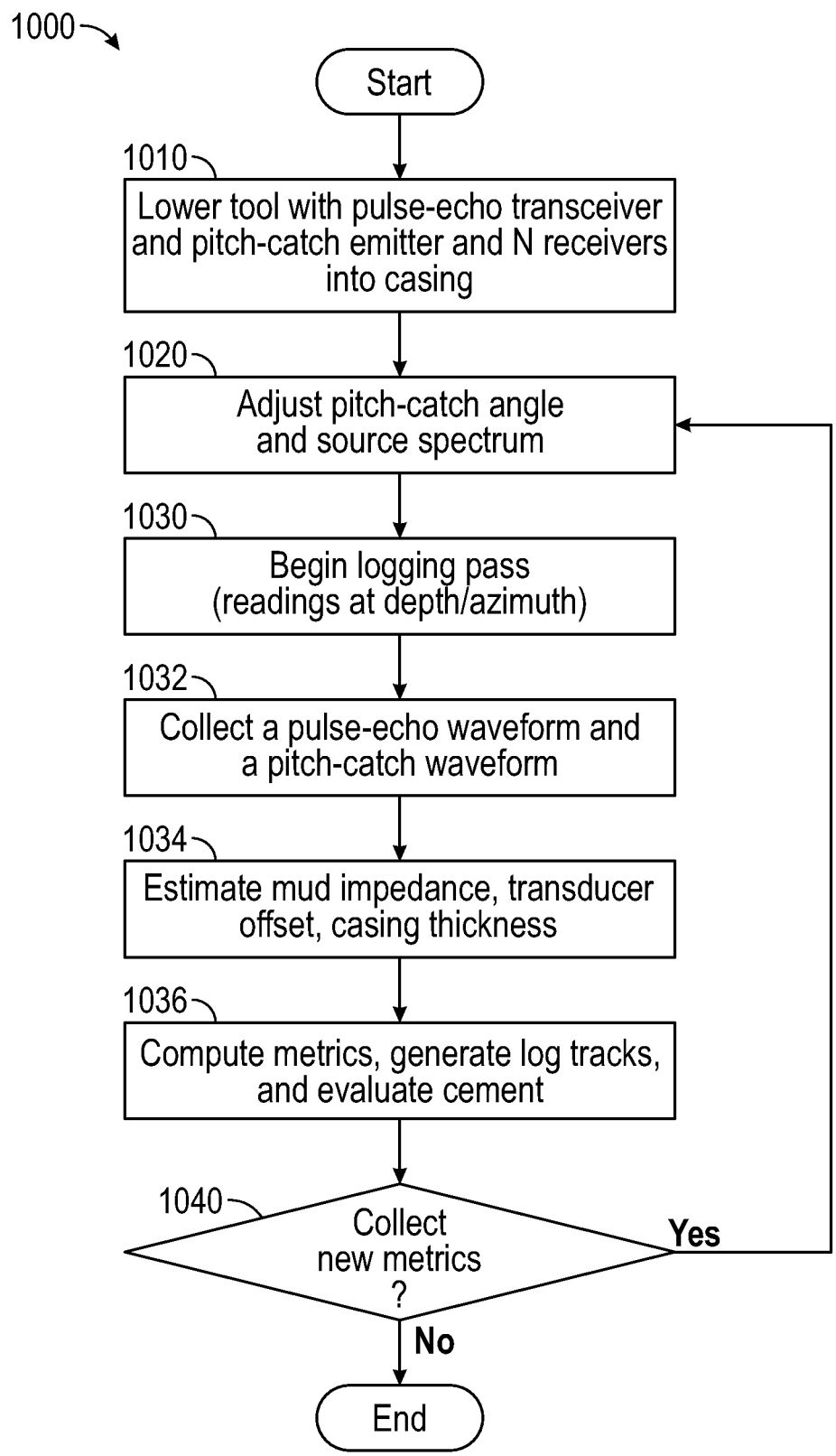
FIG. 10 is a flowchart of an exemplary method of evaluating cementation, in accordance with various aspects of the subject technology.

FIG. 10 is a flowchart 1000 of an exemplary method of evaluating cementation, in accordance with various aspects of the subject technology. In step 1010, a tool having a pulse-echo transceiver and a pitch-catch sensor array with at least one emitter and multiple receivers spaced along the tool is lowered into the casing of a wellbore and lowered to the depth proximate to the portion of the wellbore where the cementation is to be evaluated. In step 1020, the pitch-catch angles of the emitter and receivers are adjusted to excite the desired modes of a Lamb wave in the casing. Step 1030 starts an up or down logging pass through the depth interval of the casing to be evaluated. As the tool is moving through the depth interval it rotates around its vertical axis. In step 1032, at least one pulse-echo waveform and at least one pitch-catch waveform are collected per azimuth position as the tool rotates. Step 1034 estimates mud impedances, casing thicknesses, and offsets for each azimuth at each depth using methods known to those skilled in the art. The mud impedance is typically stable as a function of azimuth at a given depth for a vertical well. In certain embodiments, the mud impedance is stable as a function of azimuth and a single mud impedance estimate may be used for all azimuths at that depth.

Step 1036 uses these estimates and the waveforms to compute one or more cementation evaluation metrics. Log tracks are estimated and saved and the cementation of the examined portion of the casing is evaluated from the log tracks at the end of the pass. In step 1040, a determination is made whether to adjust the pitch-catch incidence angle for the next pass which may be a relog of the current section or a log of a new depth interval. If the evaluation of the casing is completed, step 1040 branches to the end. If the evaluation of this portion is to be repeated or another portion evaluated, step 1040 branches to step 1020.

In summary, the disclosed systems and methods evaluate attributes of the $S_0$ and the $A_0$ modes of a mixed mode Lamb wave to produce an estimate of the degree of displacement with sufficient accuracy to usefully distinguish well bonded Ultra-Low Density cement from water. For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

In the above description, terms such as "upper," "upward," "lower," "downward," "above," "below," "longitudinal," "lateral," and the like, as used herein, are explanatory in relation to respective view of the item presented in the associated figure and are not limiting in the claimed use of the item. The term "outside" refers to a region that is beyond the outermost confines of a physical object. The term "inside" indicates that at least a portion of a region is partially contained within a boundary formed by the object.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "exemplary" is used herein to refer to a system or method that serves to illustrate the concepts being disclosed but is not limiting to the scope of claims regarding the concepts thereby disclosed.

The phrase "urging an object" or similar means the application of a force to the object in a manner that will try and move the object toward a defined position or in a specific direction without implying that the object moves or that the object is restricted from moving in another direction, even backward with respect to the direction of the applied force.

Claim language reciting "at least one of" a set indicates that one member of the set or multiple members of the set satisfy the claim. For example, claim language reciting "at least one of A and B" means A, B, or A and B.

Claim language reciting "an item" or similar language indicates and includes one or more of the items. For example, claim language reciting "a part" means one part or multiple parts. Moreover, claim language reciting "at least one of" a set indicates that one member of the set or multiple members of the set satisfy the claim. For example, claim language reciting "at least one of A and B" means A, B, or A and B.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the disclosure include:

(A1. A system for evaluating well cementation, comprising: a body configured to be lowered into a casing within a wellbore; an emitter configured to emit an acoustic signal and coupled to the body at a pitch angle and frequency band selected to excite a mixed-mode Lamb wave comprising a symmetric extensional (Sn) mode and an asymmetric flexural (An) mode in the casing; and a first receiver coupled to the body at a first distance from the emitter and configured to receive a portion of the Lamb wave that has leaked from the casing at approximately the first distance.

(A2) The system of A1, wherein the pitch angle is within a range of 20-30 degrees from perpendicular to the casing.

(A3) The system of A1, wherein the first receiver is coupled to the body at a first catch angle that is approximately equal to the pitch angle.

(A4) The system of A3, wherein the pitch angle and the first catch angle can be changed while the system is disposed within the wellbore.

(A5) The system of A1, wherein the pitch angle is selected to primarily excite a single dominant S0 mode and a single dominant A0 mode of the Lamb wave in the casing.

(A6) The system of A1, further comprising a pulse-echo transceiver coupled to the body at a pulse-echo angle that is less than 5 degrees from perpendicular to the casing.

(A7) The system of A1, further comprising one or more second receivers coupled to the body at one or more second respective distances from the emitter.

(B8) A method of evaluating well cementation, comprising steps: lowering a tool into a casing surrounded by an annular material within a wellbore; causing an emitter of the tool to emit an acoustic signal at a pitch angle selected to excite a mixed-mode Lamb wave comprising a symmetric extensional (Sn) mode and an asymmetric flexural (An) mode of a Lamb wave in the casing; and receiving, with a first receiver of the tool that is disposed at a first distance from the emitter, a portion of the Lamb wave that has leaked from the casing at approximately the first distance.

(B9) The method of B8, wherein the pitch angle is within a range of 20-30 degrees from perpendicular to the casing.

(B10) The method of B8, wherein the pitch angle is selected to primarily excite a single dominant S0 mode and a single dominant A0 mode of the Lamb wave in the casing.

(B11) The method of B10, further comprising: calculating a first moment (EM1) of an energy distribution between points n1 and n2 of the mixed mode (S0, A0) portion of the first waveform, given by the equation:

$$EM1 = -\frac{\sum_{n1}^{n2}(n-n_0)n\varphi^2}{\sum_{n1}^{n2}\varphi^2}$$

(B12) The method of B11, further comprising steps: receiving, with a transceiver of the tool, a pulse-echo waveform; estimating a pulse-echo acoustic impedance based in part on the pulse-echo waveform; plotting the pulse-echo acoustic impedance vs. the EM1; and classifying the annular material as well-bonded lightweight cement or water by comparing the plot of the pulse-echo acoustic impedance vs. the first moment of the EM1 to a predetermined reference boundary.

(B13) The method of B12, wherein the reference boundary is determined from analysis of the acoustic impedance and the EM1 of the energy data in a portion of the wellbore that is known to have a free casing.

(B14) The method of B12, wherein the reference boundary is determined by lab experiments, computational modeling, analysis of pulse-echo acoustic impedance vs. the first moment plots from one or more other wellbores, or a combination thereof.

(B15) The method of B12, wherein: the step of receiving a portion of the Lamb wave comprises receiving a plurality of portions of the Lamb wave with a plurality of receivers of disposed at a respective plurality of distances from the emitter; the step of calculating the EM1 comprises calculating a respective plurality of EM1s for each portion of the Lamb wave received by the plurality of receivers; the step of plotting the pulse-echo acoustic impedance vs. the EM1 comprises plotting the respective plurality of EM1s; and the step of classifying the annular material comprises comparing the plots of the respective plurality of EM1s against a plurality of predetermined boundaries respectively associated with the plurality of receivers.

What is claimed is:

1. A system for evaluating well cementation, comprising:
a body configured to be lowered into a casing within a wellbore;
an emitter configured to emit an acoustic signal and coupled to the body at a pitch angle and frequency band selected to excite a mixed-mode Lamb wave comprising a symmetric extensional ($S_n$) mode and an asymmetric flexural ($A_n$) mode in the casing;
wherein the pitch angle is selected to primarily excite a single dominant $S_0$ mode and a single dominant $A_0$ mode of the Lamb wave in the casing; and
a first receiver coupled to the body at a first distance from the emitter and configured to receive a portion of the Lamb wave that has leaked from the casing at approximately the first distance and calculate a first moment (EM1) of an energy distribution between points n1 and n2 of the mixed mode ($S_0$, $A_0$) portion of the first waveform, given by the equation:

$$EM1 = -\frac{\sum_{n1}^{n2}(n-n_0)n\varphi^2}{\sum_{n1}^{n2}\varphi^2}.$$

2. The system of claim 1, wherein the pitch angle is within a range of 20-30 degrees from perpendicular to the casing.

3. The system of claim 1, wherein the first receiver is coupled to the body at a first catch angle that is approximately equal to the pitch angle.

4. The system of claim 3, wherein the pitch angle and the first catch angle can be changed while the system is disposed within the wellbore.

5. The system of claim 1, wherein the pitch angle is selected to primarily excite a single dominant $S_0$ mode and a single dominant $A_0$ mode of the Lamb wave in the casing.

6. The system of claim 1, further comprising a pulse-echo transceiver coupled to the body at a pulse-echo angle that is less than 5 degrees from perpendicular to the casing.

7. The system of claim 1, further comprising one or more second receivers coupled to the body at one or more second respective distances from the emitter.

8. A method of evaluating well cementation, comprising steps:
lowering a tool into a casing surrounded by an annular material within a wellbore;
causing an emitter of the tool to emit an acoustic signal at a pitch angle selected to excite a mixed-mode Lamb wave comprising a symmetric extensional ($S_n$) mode and an asymmetric flexural ($A_n$) mode of a Lamb wave in the casing;
wherein the pitch angle is selected to primarily excite a single dominant $S_0$ mode and a single dominant $A_0$ mode of the Lamb wave in the casing; and
receiving, with a first receiver of the tool that is disposed at a first distance from the emitter, a portion of the Lamb wave that has leaked from the casing at approximately the first distance and calculating a first moment (EM1) of an energy distribution between points n1 and n2 of the mixed mode ($S_0$, $A_0$) portion of the first waveform, given by the equation:

$$EM1 = -\frac{\sum_{n1}^{n2}(n-n_0)n\varphi^2}{\sum_{n1}^{n2}\varphi^2}.$$

9. The method of claim 8, wherein the pitch angle is within a range of 20-30 degrees from perpendicular to the casing.

10. The method of claim 8, further comprising steps:
receiving, with a transceiver of the tool, a pulse-echo waveform;
estimating a pulse-echo acoustic impedance based in part on the pulse-echo waveform;
plotting the pulse-echo acoustic impedance vs. the EM1; and
classifying the annular material as well-bonded lightweight cement or water by comparing the plot of the pulse-echo acoustic impedance vs. the first moment of the EM1 to a predetermined reference boundary.

11. The method of claim 10, wherein the reference boundary is determined from analysis of the acoustic impedance and the EM1 of the energy data in a portion of the wellbore that is known to have a free casing.

12. The method of claim 10, wherein the reference boundary is determined by lab experiments, computational modeling, analysis of pulse-echo acoustic impedance vs. the first moment plots from one or more other wellbores, or a combination thereof.

13. The method of claim 10, wherein:
the step of receiving a portion of the Lamb wave comprises receiving a plurality of portions of the Lamb wave with a plurality of receivers of disposed at a respective plurality of distances from the emitter;

the step of calculating the EM1 comprises calculating a respective plurality of EM1s for each portion of the Lamb wave received by the plurality of receivers;

the step of plotting the pulse-echo acoustic impedance vs. the EM1 comprises plotting the respective plurality of EM1s; and the step of classifying the annular material comprises comparing the plots of the respective plurality of EM1s against a plurality of predetermined boundaries respectively associated with the plurality of receivers.

* * * * *